No. 777,806.

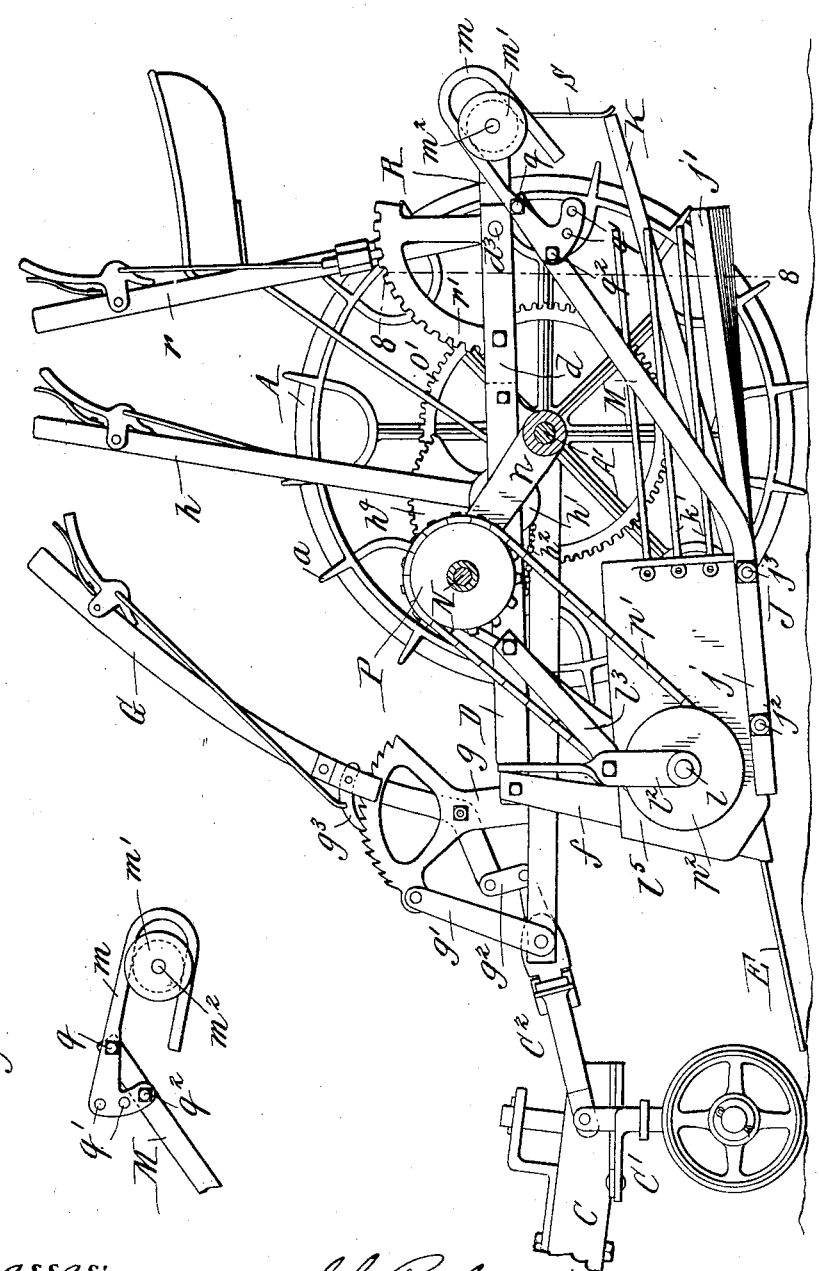

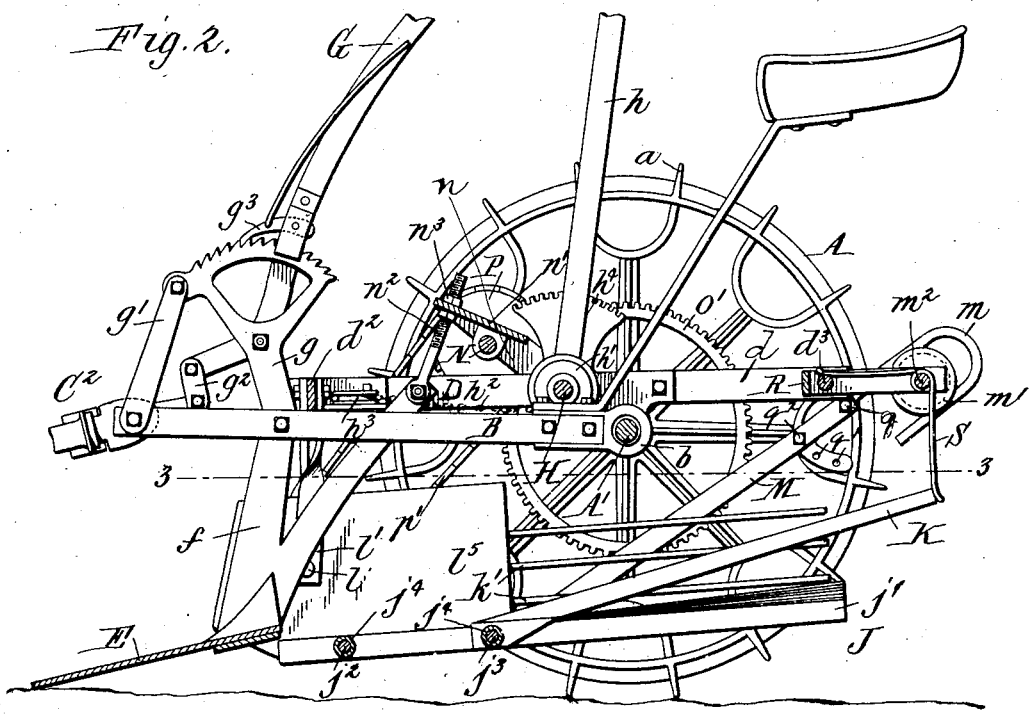

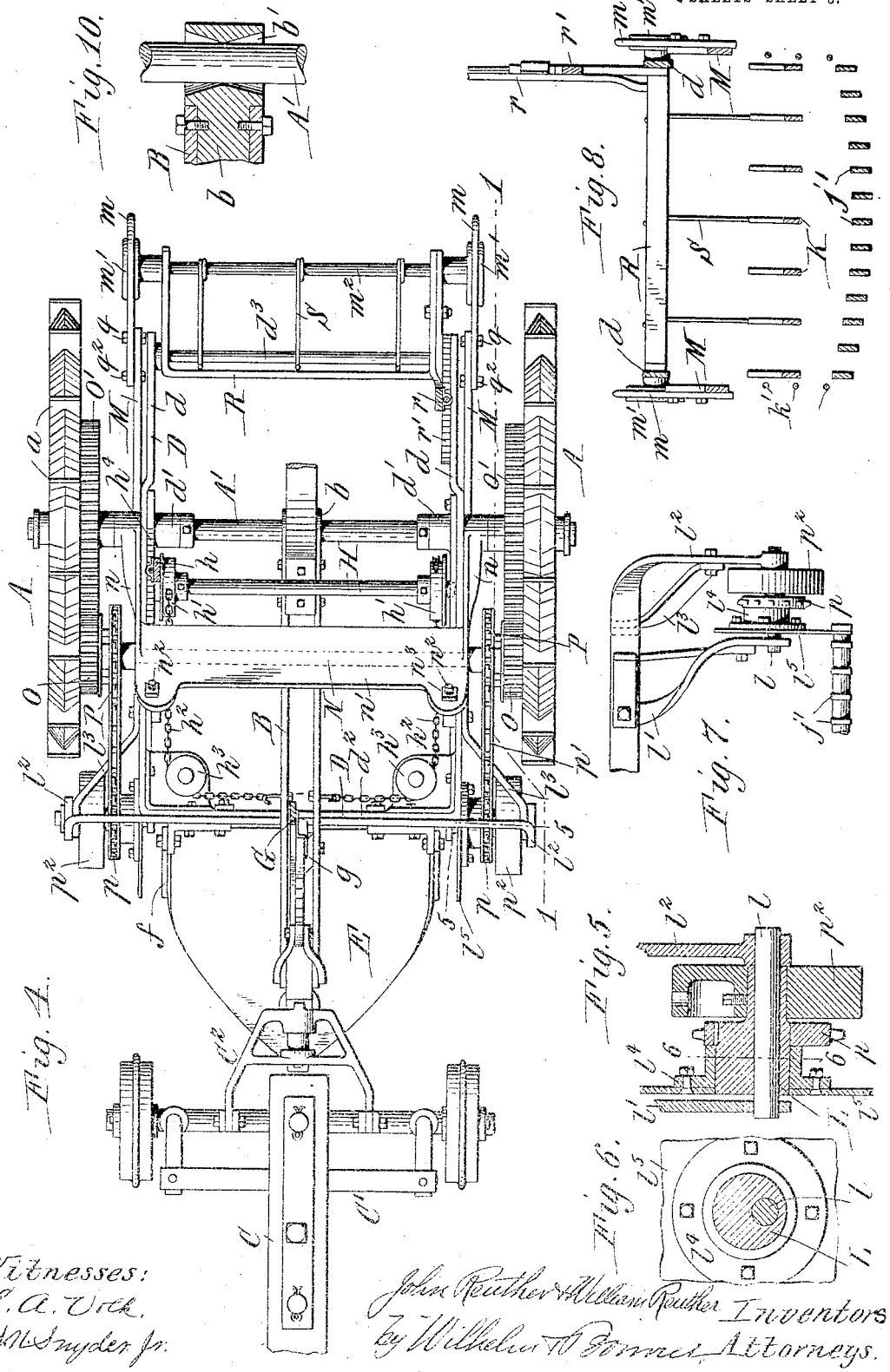

Patented December 20, 1904.

UNITED STATES PATENT OFFICE.

JOHN REUTHER AND WILLIAM REUTHER, OF ELMA, NEW YORK.

POTATO-DIGGER.

SPECIFICATION forming part of Letters Patent No. 777,806, dated December 20, 1904.

Application filed June 12, 1903. Serial No. 161,132.

*To all whom it may concern:*

Be it known that we, JOHN REUTHER and WILLIAM REUTHER, citizens of the United States, and residents of Elma, in the county of Erie and State of New York, have invented new and useful Improvements in Potato-Diggers, of which the following is a specification.

This invention relates to a potato-digger of that kind which comprises an inclined plow or scoop which digs into the hills and elevates the soil, potatoes, and vines and a shaking separator which is arranged in rear of said plow, receives the material from the plow, and agitates the same to separate the potatoes from the soil and vines, the soil dropping through the spaces between the separator-bars, while the potatoes and vines are discharged over the rear end of the separator.

The invention is more particularly directed to improvements in the potato-digger disclosed in United States Patent No. 675,139, granted to J. and W. Reuther May 28, 1901.

One object of the invention is to provide a potato-digger with a separator which will thoroughly separate the potatoes from the soil regardless of the condition of the latter and will also separate the vines from the potatoes.

Another object of the invention is to provide simple and effective operating mechanism for the separator.

Another object of the invention is to provide means for discharging the vines in bunches from the separator.

A still further object of the invention is to provide an efficient desirable potato-digger of simple, light, strong, and inexpensive construction.

In the accompanying drawings, consisting of three sheets, Figure 1 is a sectional elevation in line 1 1, Fig. 4, of a potato-digger embodying the invention. Fig. 2 is a central longitudinal sectional elevation thereof. Fig. 3 is a horizontal section in line 3 3, Fig. 2, showing the separator in plan. Fig. 4 is a plan view of the machine, showing parts in horizontal section. Fig. 5 is a detail sectional view, on an enlarged scale, in line 5 5, Fig. 4, showing one of the operating-eccentrics for the separator. Fig. 6 is a transverse section in line 6 6, Fig. 5. Fig. 7 is a fragmentary front elevation showing the supporting and operating means for the front end of the separator. Fig. 8 is a transverse section of the machine in line 8 8, Fig. 1. Fig. 9 is a detail elevation of the upper portion of one of the supporting-arms for the separator. Fig. 10 is a horizontal section of the casting connecting the draft-bar and axle.

Like letters of reference refer to like parts in the several figures.

A represents the ground-wheels, which are journaled on the ends of an axle $A'$ and which may be of any ordinary construction. The wheels are preferably provided with rims of V-shape cross-section having transverse lugs or wings $a$, as shown in the drawings.

B represents a longitudinal draft bar or frame, which is connected at its rear end to the axle, so that the draft-bar is capable of a limited lateral swing relative to the axle. Preferably the rear end of the draft-bar is provided with a casting $b$, having a hole $b'$, through which the axle passes, said hole being contracted centrally and enlarged at its ends to permit the horizontal swinging of the axle in the hole.

C represents a tongue or pole which is supported at its rear end upon a truck $C'$ of any well-known construction. As shown in Figs. 1 and 4, this truck is connected with the draft-bar B by an intermediate frame $C^2$, which is pivoted at its front end to the truck and at its rear end to the front end of the draft-bar.

D represents the main or supporting frame for the plow and separator. The supporting-frame is substantially rectangular and consists of side bars $d$, which are rigidly secured to collars $d'$, Fig. 4, sleeved on the axle, a front cross-bar $d^2$, which rests upon the top of the draft-bar, and a rear cross bar or rod $d^3$.

E represents the plow or scoop, which is of any usual or suitable form and is secured to a U-shaped frame $f$, secured to and depending from the front end of the main frame.

The frame D is adapted to swing vertically with the draft-bar on the axle for the purpose of regulating the depth to which the plow enters the ground and for raising the plow clear of the ground when the machine is not in operation. The front end of the main frame is raised and lowered by a lever G, which is pivoted on a standard $g$, rising from the draft-bar, and suitably braced by a rod $g'$. The lower arm of the lever is connected by a link with an arm $g^2$, extending rearwardly from the intermediate frame, connecting the tongue with the draft-bar. The lever is provided with an ordinary locking-dog $g^3$, which coöperates with a toothed segment on the standard $g$. When the lever is swung rearwardly, the draft-bar is raised and lifts the front end of the main frame and plow, and when the lever is swung forwardly the front end of the draft-bar, main frame, and plow are lowered.

The machine is preferably provided with suitable means for turning the ground-wheels at more or less of an angle to the line of draft, so that in operating the machine on a hillside the wheels tend to run up the hill, and thus counteract the tendency of the machine to slide downhill. This means, which is shown in Fig. 4, is preferably constructed as follows: H represents a horizontal transverse rock-shaft, which is journaled at its ends in suitable bearings on the side bars of the main frame and is provided at one end with an upright operating-lever $h$. The rock-shaft is provided near its opposite ends with drums $h'$, to which are secured the rear ends of chains $h^2$, which extend forwardly around horizontal pulleys $h^3$, journaled on the forward portion of the main frame, and are connected at their front ends to the draft-bar. One chain is secured to its drum above the rock-shaft, while the other chain is secured to its drum below the rock-shaft. When the shaft is rocked forwardly or rearwardly by its lever, the front portion of the supporting-frame is shifted laterally to one side or the other at an angle to the draft-bar, thereby turning the ground-wheels at an angle to the line of draft. The operating-lever $h$ for the rock-shaft is provided with a suitable dog and coöperating toothed segment $h^4$ to hold the lever and rock-shaft in adjusted position.

J represents the vibrating or shaking separator, which is arranged lengthwise of the machine in rear of the plow. The separator (see Figs. 2, 3, and 8) preferably consists of longitudinal side bars $j$ and intermediate spaced longitudinal separating tines or bars $j'$, which are connected by transverse tie-rods $j^2 j^3$, passing through holes in the side and intermediate bars of the separator. The intermediate bars or tines are arranged on edge and are separated by spacing-sleeves $j^4$, surrounding the tie-rods.

K represents supplemental bars or tines, which are spaced farther apart than the main separator-bars and incline upwardly and rearwardly from the central portion of the separator. The lower ends of the supplemental bars are preferably secured on the rear tie-rod $j^3$ beside the alternate lower bars and have offset shoulders $k$, which bear on the top edges of the lower bars and hold the supplemental bars.

In the operation of the machine the vines and large lumps of earth pass up onto the supplemental bars, and the lumps, dropping between the upper bars onto the lower bars, are broken up, thus greatly facilitating the separation of the potatoes from the earth and vines. The supplemental bars are of special value when working in wet soil, as they hold the vines up out of the main body of the material, so that they will not catch the earth which will cling to them. The separator is preferably provided at its opposite sides with longitudinal guard-rods $k'$, which prevent the vines and soil from working sidewise off of the separator.

The separator is supported at its forward end and vibrated by rotary eccentrics L, (see Figs. 5 and 6,) arranged at opposite sides of the separator near its front end. Each eccentric is mounted to rotate on a horizontal stud or shaft $l$, supported at its inner and outer ends in suitable brackets or bearings $l'$ $l^2$, depending from the main frame D. The outer brackets $l^2$ are preferably formed by the downturned ends of a horizontal bar secured to the front bar of the main frame and suitable braces $l^3$, Figs. 1 and 4. The inner brackets are formed by vertical bars secured at their upper ends to the front bar of the main frame. The eccentrics pass through and rotate in bearings $l^4$ on vertical plates $l^5$, secured to and rising from the opposite side bars of the separator. The rear end of the separator is movably supported by inclined arms M, which are secured at their lower ends to or formed with the side bars of the separator and are provided at their upper rear ends with loops or hooks $m$, which engage over and slide on grooved pulleys or wheels $m'$, mounted on a transverse rod or shaft $m^2$, supported at the rear end of the main frame.

The operating-eccentrics for the separator are preferably driven by the following mechanism: N represents a transverse horizontal shaft, which is journaled near its opposite ends in bearings in arms $n$, which are mounted to swing on the axle A' and are connected by the footboard $n'$. The bearing-arms $n$ for the shaft are held stationary by adjusting-screws $n^2$, Figs. 2 and 4, pivoted at their lower ends to the sides of the main frame and passing through holes in the footboard, which is clamped between nuts $n^3$ on said screws. The shaft N is provided at its opposite ends with gear-wheels O, which mesh with and are driven by gear-wheels O', secured to the ground-wheels. The gear-wheels O are coupled to the shaft N by any usual or suitable coupling devices, (not shown,) whereby the shaft N is driven when the ground-wheels turn forwardly. The shaft N is also provided near its ends with sprocket-wheels P, over which and sprocket-wheels $p$, formed on or secured to the eccentrics L, run drive-chains $p'$. The drive-chains $p'$ can be properly tensioned by adjusting the footboard and shaft N carried thereby up or down on the screws $n^2$. $p^2$, Figs. 1, 4, and 5, indicates balance-wheels secured to the rotary eccentrics L.

The operation of the machine is as follows: When the plow is lowered and the machine drawn forwardly, the plow digs into the ground, scooping up the earth, potatoes, and vines, which pass rearwardly onto the separator. The operating-eccentrics L for the separator are rotated from the ground-wheels by the described drive mechanism and impart a compound up-and-down and forward-and-rearward movement to the front end of the separator. The looped supporting-arms for the rear end of the separator slide back and forth and rock on their supporting-wheels $m'$, thus permitting the rear end of the separator to partake in the described compound movement. This movement of the separator tends to throw or toss the material on the separator and also to move the same rearwardly, thus thoroughly agitating the material, so as to cause a complete separation of the potatoes from the earth and vines and to properly discharge the potatoes and vines over the rear end of the separator. The vines and larger lumps or clods of earth pass up on the supplemental bars K, and the lumps of earth fall between these bars onto the lower bars, by which they are broken, so as to drop through the narrow spaces between the lower bars. The lower bars are not spaced far enough apart for the potatoes to fall between them and the potatoes work off of the rear ends of the lower bars. When the soil is wet or tenacious, a more violent up-and-down movement of the rear end of the separator is necessary to break the soil and remove the same from the potatoes, whereas when the soil is dry the rear end of the separator preferably has less up-and-down movement. To properly regulate this up-and-down movement of the rear end of the separator, the loops or hooks $m$ are adjustably connected to the arms M. In the construction shown each loop is pivoted at $q$ to the upper end of its arm and is provided with an angular portion having a series of holes $q'$ concentric with said pivot. $q^2$ is a bolt which passes through a hole in the supporting-arm and one of said holes in the angular portion of the loop. When the bolt $q^2$ is secured in the first hole $q'$, as shown in Fig. 1, the rear end of the separator has its maximum up-and-down movement, and the movement is lessened by shifting the bolt $q^2$ into another of the holes, as shown in Fig. 9. It is also desirable to change the inclination of the separator to support its rear end at different elevations to better operate upon different soils. For this purpose the transverse rod $m^2$, on which the supporting-arms for the rear end of the separator are hung, is supported by the rear end of a substantially U-shaped frame R, which is pivoted near its forward end on the rear transverse bar of the main frame D. The frame R is provided at one side with an upright lever $r$ for swinging the same to raise and lower its rear end and the rod $m^2$. The lever swings beside a toothed segment $r'$, secured to the adjacent side bar of the main frame, and is provided with a locking-dog to engage the teeth of said segment to hold the lever and said frame R in the desired position.

S represents spring retaining-fingers carried by the transverse rod $m^2$ and which extend down in rear of the supplemental bars of the separator. The retaining-fingers are preferably formed by wires bent around the transverse bar $m^2$ and having forwardly-extending arms bearing against the rear cross-bar of the main frame. The retaining-fingers prevent the vines from passing off of said bars until they have collected in sufficient quantity to spring the fingers rearwardly and escape between the same and the rear ends of the supplemental bars of the separator, thus serving to bunch the vines more or less and prevent the latter from falling promiscuously along the ground and covering the potatoes.

We claim as our invention—

1. The combination of a frame, a plow, a separator arranged in rear of the plow, eccentrically-rotating means directly connecting the frame and front portion of the separator and movably supporting the latter, and means supporting the rear portion of the separator and having sliding and rocking connection with the frame whereby the separator has an up-and-down and back-and-forth pitching motion, substantially as set forth.

2. The combination of a frame, a plow, a separator arranged in rear of said plow, rotary operating-eccentrics for said separator mounted on said frame and working in bearings secured to the front portion of said separator, and supporting-arms secured to said separator and having sliding and rocking connections with the rear portion of said frame, substantially as set forth.

3. The combination of a frame, a plow, a separator arranged in rear of said plow, rotary eccentrics mounted on said frame at opposite sides of the front end of said separator, bearings on the sides of said separator at the front end thereof in which said eccentrics work, and supporting-arms secured to said separator and connected to the rear portion of said frame so as to slide and rock thereon, substantially as set forth.

4. The combination of a frame, a plow, a separator arranged below said frame in rear of said plow, rotary eccentrics mounted on said frame at opposite sides of the forward portion of said separator, bearings secured to said separator in which said eccentrics work, supporting-arms secured to said separator and extending upwardly and rearwardly therefrom and provided at their upper ends with loops, and grooved wheels on which said loops slide and rock, substantially as set forth.

5. The combination of a frame, a plow, a separator arranged below said frame in rear of said plow, rotary eccentrics mounted on said frame and working in bearings secured to the front portion of said separator, supporting-arms secured to said separator and extending upwardly and rearwardly therefrom and having sliding and rocking engagements with said frame, the upper ends of said supporting-arms being adjustable angularly relative to the lower portions of said supporting-arms, substantially as set forth.

6. The combination of a frame, a plow, a separator arranged below said frame in rear of said plow, rotary eccentrics mounted on said frame and working in bearings secured to the front portion of said separator, supporting-arms secured to said separator and extending upwardly and rearwardly therefrom, wheels mounted on the rear portion of said frame, and loops adjustably secured to the upper ends of said supporting-arms and having sliding and rocking engagements with said wheels, substantially as set forth.

7. The combination of a main frame, a plow, a separator arranged below said frame in rear of said plow, rotary eccentrics mounted on said frame and working in bearings on the front portion of said separator, supporting-arms secured to said separator, a frame adjustably secured to the rear portion of said main frame and having parts with which the supporting-arms have a sliding and rocking engagement, substantially as set forth.

8. The combination of a main frame, a plow, a separator arranged below said main frame in rear of said plow, eccentrics mounted to rotate on said main frame and working in bearings on the front portion of said separator, drive mechanism for said eccentrics, a frame pivoted to swing vertically on the rear portion of said main frame and provided with grooved wheels, means for holding said pivoted frame in adjusted positions, and supporting-arms secured to said separator and having at their upper ends sliding and rocking engagements with said grooved wheels, substantially as set forth.

9. The combination of a frame, ground-wheels, a plow, a vibrating separator arranged in rear of said plow, rotary eccentrics journaled on said frame adjacent to the opposite sides of the front portion of said separator and working in bearings on the front portion of said separator, a shaft journaled on said frame and geared to said ground-wheels, sprocket-wheels on said shaft, sprocket-wheels on said eccentrics, and drive-chains connecting said sprocket-wheels, substantially as set forth.

10. The combination of a plow, a separating-surface which is arranged in rear of and receives the material to be separated from the plow, means for imparting an up-and-down and back-and-forth pitching motion to the separating-surface, and bars fixed to and movable with the separating-surface and inclining upwardly from the intermediate portion thereof and which hold the vines off of and deliver the same over the separating-surface, substantially as set forth.

11. The combination of a plow, a separator comprising longitudinally-spaced separating-bars arranged in rear of and inclining upwardly and rearwardly from the plow and which receives the material to be separated directly from the plow, means for imparting an up-and-down and back-and-forth pitching motion to the separator, supplemental bars fixed to and movable with the separator and inclining upwardly and rearwardly from the intermediate portion thereof, said supplemental bars being spaced farther apart than said separating-bars and acting to hold the vines off of and deliver the same over the rear ends of the separating-bars, substantially as set forth.

12. A vibrating separator comprising longitudinally-arranged spaced separating-bars, a tie-rod connecting said separating-bars, and supplemental bars secured at their lower ends to said tie-bar and extending upwardly and rearwardly therefrom, said supplemental bars having shoulders which bear against the tops of said separating-bars, substantially as set forth.

13. The combination of a frame, a plow, a vibrating separator arranged below said frame in rear of said plow, said separator comprising longitudinally-arranged spaced separating-bars, and supplemental bars which are secured to said separating-bars and extend upwardly and rearwardly therefrom, and yielding vine-retaining fingers depending from said frame at the rear ends of said supplemental bars, substantially as set forth.

14. The combination of a plow, a separating-surface arranged in rear of said plow, bars arranged above said separating-surface and which hold the vines off of said separating-surface, and yielding vine-retaining fingers at the rear ends of said bars, substantially as set forth.

Witness our hands this 28th day of May, 1903.

JOHN REUTHER.
WILLIAM REUTHER.

Witnesses:
RUSSELL B. CLARK,
MYRON H. CLARK.